United States Patent
Landeros et al.

(10) Patent No.: US 10,431,927 B2
(45) Date of Patent: Oct. 1, 2019

(54) MANUAL CLAM PLUG CONNECTOR

(71) Applicants: Oscar Landeros, Brawley, CA (US); Oscar Landeros, Jr., Brawley, CA (US)

(72) Inventors: Oscar Landeros, Brawley, CA (US); Oscar Landeros, Jr., Brawley, CA (US)

( * ) Notice: Subject to any disclaimer, the term of this patent is extended or adjusted under 35 U.S.C. 154(b) by 0 days.

(21) Appl. No.: 15/963,105

(22) Filed: Apr. 26, 2018

(65) Prior Publication Data

US 2018/0316126 A1 Nov. 1, 2018

Related U.S. Application Data

(60) Provisional application No. 62/491,341, filed on Apr. 28, 2017.

(51) Int. Cl.

| H01R 11/00 | (2006.01) |
|---|---|
| H01R 13/629 | (2006.01) |
| H02S 40/34 | (2014.01) |
| H01R 13/627 | (2006.01) |
| B25B 7/12 | (2006.01) |
| B25B 27/10 | (2006.01) |
| H01R 43/26 | (2006.01) |

(52) U.S. Cl.
CPC ........... *H01R 13/629* (2013.01); *B25B 7/123* (2013.01); *B25B 27/10* (2013.01); *H01R 13/627* (2013.01); *H01R 43/26* (2013.01); *H02S 40/34* (2014.12)

(58) Field of Classification Search
CPC ...... H01R 11/24; H01R 31/06; H01R 25/003; H01R 11/282
USPC ................. 439/504, 829, 502–506
See application file for complete search history.

(56) References Cited

U.S. PATENT DOCUMENTS 4,934,957 A * 6/1990 Bellusci ................. H01R 11/24
439/504

* cited by examiner

*Primary Examiner* — Phuong Chi T Nguyen
(74) *Attorney, Agent, or Firm* — The Iwashko Law Firm, PLLC; Lev Ivan Gabriel Iwashko

(57) ABSTRACT

A manual clam plug connector to connect a plug connector, the manual clam plug connector including a vice-grip locking pliers disposed at a first end of the manual clam plug connector to be squeezed manually, and a connecting clam disposed at a second end of the manual clam plug connector to be squeezed in response to the vice-grip locking pliers being squeezed, such that a female connector end of the plug connector and a male connector end of the plug connector are brought together in response to the connecting clam being squeezed.

3 Claims, 2 Drawing Sheets

MANUAL CLAM PLUG CONNECTOR

CROSS-REFERENCE TO RELATED APPLICATIONS

This application claims priority under 35 USC § 120 from U.S. Provisional Application No. 62/491,341, filed on Apr. 28, 2017, in the United Stated Patent and Trademark Office, the disclosure of which is incorporated herein in its entirety by reference.

BACKGROUND

1. Field

The present general inventive concept relates generally to a manual clam plug connector, and more particularly, to a manual clam plug connector to facilitate plugging connectors on solar panels.

2. Description of the Related Art

Renewable energy is growing rapidly within our society, yet the construction and maintenance of solar panels, specifically, still require a great deal of physical labor and strain. Often the most challenging aspect is connecting the modules for maximum coverage as professionals tend to use multiple tools or hard to maneuver items that take-up time and labor.

Therefore, there is a manual clam plug connector that simplifies the process of plugging connectors on one or more solar panels.

SUMMARY

The present general inventive concept provides a manual clam plug connector to facilitate plugging connectors on solar panels.

It is an object of the present general inventive concept to provide a manual clam plug connector that quickly connects solar panels by simply squeezing the opposing ends together to create the tension required to uphold the connectors ensuring a secure fit amongst the string of modules.

It is an object of the present general inventive concept to provide a manual clam plug connector that is made with high-quality metal materials for longevity.

It is an object of the present general inventive concept to provide a manual clam plug connector that includes a tool box for quick transport and storage.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a manual clam plug connector to connect a plug connector, the manual clam plug connector including a vice-grip locking pliers disposed at a first end of the manual clam plug connector to be squeezed manually, and a connecting clam disposed at a second end of the manual clam plug connector to be squeezed in response to the vice-grip locking pliers being squeezed, such that a female connector end of the plug connector and a male connector end of the plug connector are brought together in response to the connecting clam being squeezed.

The connecting clam may include protrusions at end portions thereof, extending in a direction away from the vice-grip locking pliers.

The female connector end and the male connector may be are removably attached to the protrusions.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
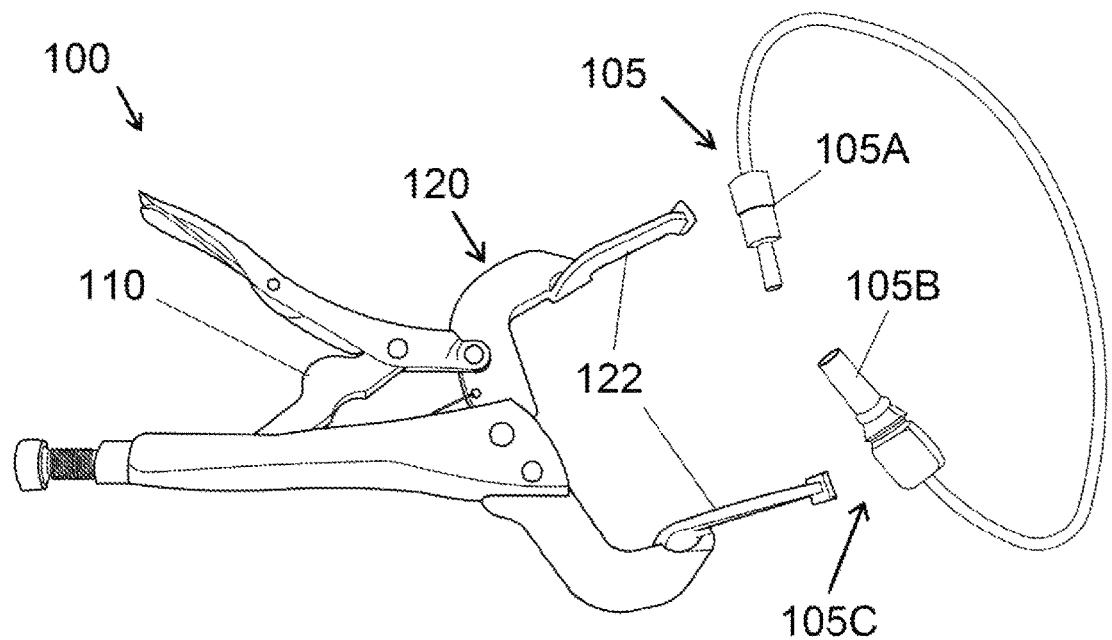
FIG. 1 illustrates an environmental overhead view of a manual clam plug connector and a plug connector, according to an exemplary embodiment of the present general inventive concept.

FIG. 1 illustrates an environmental overhead view of a manual clam plug connector 100 and a plug connector 105, according to an exemplary embodiment of the present general inventive concept.

FIG. 1 illustrates the plug connector 105 in an unplugged position.

The manual clam plug connector 100 may include a vice-grip locking pliers 110 and a connecting clam 120.

The vice-grip locking pliers 110 may be squeezed to bring a female connector end 105A and a male connector end 105B of the plug connector 105 together. The plug connector 105 may be a solar panel plug connector 105C or other suitable plug connector. The connecting clam 120 may include a pair of grasping tongs 122 to grasp the female connector end 105A and the male connector end 105B of the plug connector 105.

Figure 2:
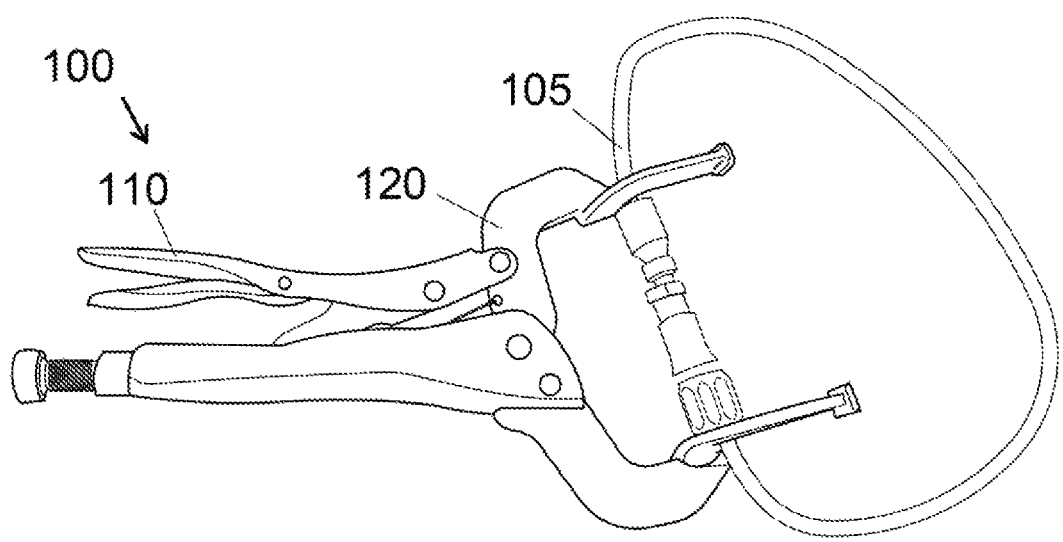
FIG. 2 illustrates an environmental side view of a manual clam plug connector coupled to a plug connector, according to an exemplary embodiment of the present general inventive concept.

FIG. 2 illustrates an environmental side view of a manual clam plug connector 100 coupled to a plug connector 105, according to an exemplary embodiment of the present general inventive concept.

FIG. 2 illustrates the plug connector 105 in a plugged-in position with the vice-grip locking pliers 110 being squeezed, in order to secure the female connector end 105A to the male connector end 105B.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A manual clam plug connector to connect a plug connector, the manual clam plug connector comprising:
   a vice-grip locking pliers disposed at a first end of the manual clam plug connector to be squeezed manually; and
   a connecting clam disposed at a second end of the manual clam plug connector to be squeezed in response to the vice-grip locking pliers being squeezed, such that a female connector end of the plug connector and a male connector end of the plug connector are brought together in response to the connecting clam being squeezed.

2. The manual clam plug connector of claim 1, wherein the connecting clam includes protrusions at end portions thereof, extending in a direction away from the vice-grip locking pliers.

3. The manual clam plug connector of claim 2, wherein the female connector end and the male connector end are removably attached to the protrusions.

* * * * *